US010038510B2

(12) United States Patent
Maddams (10) Patent No.: US 10,038,510 B2
(45) Date of Patent: Jul. 31, 2018

(54) MIXING DIGITAL AUDIO

(71) Applicant: Red Lion 49 Limited, Kidlington Oxford, Oxfordshire (GB)

(72) Inventor: Jacob Anthony Maddams, Oxford (GB)

(73) Assignee: Red Lion 49 Limited, Begbroke, Kidlington Oxford, Oxfordshire (GB)

( * ) Notice: Subject to any disclaimer, the term of this patent is extended or adjusted under 35 U.S.C. 154(b) by 0 days.

(21) Appl. No.: 15/255,378

(22) Filed: Sep. 2, 2016

(65) Prior Publication Data

US 2017/0078034 A1    Mar. 16, 2017

(30) Foreign Application Priority Data

Sep. 11, 2015 (GB) .................................. 1516127.6

(51) Int. Cl.
*H04B 1/00* (2006.01)
*H04H 60/04* (2008.01)
*G06F 3/16* (2006.01)

(52) U.S. Cl.
CPC ............... *H04H 60/04* (2013.01); *G06F 3/16* (2013.01)

(58) Field of Classification Search
CPC . G06F 1/203; G06F 3/16; G06F 3/162; G06F 3/165; G06F 3/167; G06F 17/30017
USPC ........................................... 381/118–119, 124
See application file for complete search history.

(56) References Cited

U.S. PATENT DOCUMENTS

| | | | |
|---|---|---|---|
| 2014/0181403 A1* | 6/2014 | Lilly | G06F 12/0811 711/122 |
| 2016/0179147 A1* | 6/2016 | Burr | G06F 1/203 361/679.54 |
| 2016/0274923 A1* | 9/2016 | Harriman | G06F 1/3203 |

FOREIGN PATENT DOCUMENTS

EP        2083525 A1    7/2009

* cited by examiner

*Primary Examiner* — Disler Paul
(74) *Attorney, Agent, or Firm* — Richard M. Goldberg (57) ABSTRACT

A method of mixing digital audio uses a plurality of mixing buses. Each mixing bus receives at least one input digital audio signal via a respective input. A sample value (801-805) of each input digital audio signal is stored in shared last level cache in the CPU. Then, for each unique input to the mixing buses in turn, the sample values (801-805) of the input digital audio signals are written (806) to a contiguous portion (808) of the shared last level cache. Then, for each input of each of the mixing buses in turn, the sample value for the corresponding input digital audio signal is added to an output value for the bus (809). When complete, the respective output values (810) for each of the mixing buses is then written to shared last level cache.

15 Claims, 12 Drawing Sheets

MIXING DIGITAL AUDIO

CROSS REFERENCE TO RELATED APPLICATIONS

This application claims priority from United Kingdom Patent Application No 15 16 127.6 filed on Sep. 11, 2016, the whole contents of which are incorporated herein by reference in their entirety.

BACKGROUND OF THE INVENTION

1. Field of the Invention

The present invention relates to mixing digital audio using a plurality of mixing buses, each of which receives at least one input digital audio signal via a respective input for mixing into one output digital audio signal.

2. Description of the Related Art

Audio mixing consoles, often used in music production, live events and broadcasting, are tending to make more use of digital signal processing in place of analog processing. This may be achieved using specialized digital signal processors and application-specific integrated circuits, or alternatively may be achieved by using general purpose x86 central processing units (it will be appreciated that use of the term "x86" herein concerns the Intel® microprocessor architecture in general and therefore encompasses the x86-64 extension thereto). The latter approach has been employed by the present applicant in recent mixing consoles to reduce complexity and cost.

Whilst the use of x86 has been successful, in particular due to the introduction of CPUs with between six and twelve cores to allow a high degree of parallelism, a problem is encountered with the speed of access to last level cache in a CPU. One application in which this upper bound on access speed manifests itself is in the relatively simple task of combining digital audio signals, each of which is possibly subject to a respective level of gain, into one output for further processing. In analog consoles this was achieved by using a bus having multiple inputs, which would each be supplied to a summing amplifier or similar. In a digital processing environment, the well-known multiply-accumulate operation is carried out.

In a mixing console with a large number of channels, a large number of buses may be required. Given a resulting large number of inputs, the required number of multiply and addition operations may soon become overwhelming for a CPU-based digital audio processing system due to limitations in how fast data can be brought in and out of last level cache by the memory controller in the CPU. Thus, even with additional processing capacity provided by more cores on the CPU die, there can become a point at which no more inputs can be summed.

BRIEF SUMMARY OF THE INVENTION

The invention is directed towards a method of mixing digital audio using a multi-core CPU, and a mixing console with a multi-core CPU for mixing digital audio. Each mixing bus receives at least one input digital audio signal via a respective input. A sample value of each input digital audio signal is stored in shared last level cache in the CPU. Then, for each unique input to the mixing buses in turn, the sample values of the input digital audio signals are written to a contiguous portion of the shared last level cache. Then, for each input of each of the mixing buses in turn, the sample value for the corresponding input digital audio signal is added to an output value for the bus. When that process is complete, the respective output values for each of the mixing buses is then written to shared last level cache.

The step of writing the sample values to a contiguous portion of the shared last level cache imposes a latency, but makes the process of retrieving those values so that they may be added to output values for buses faster, making the overall procedure more efficient.

DETAILED DESCRIPTION OF THE INVENTION

Figure 1:
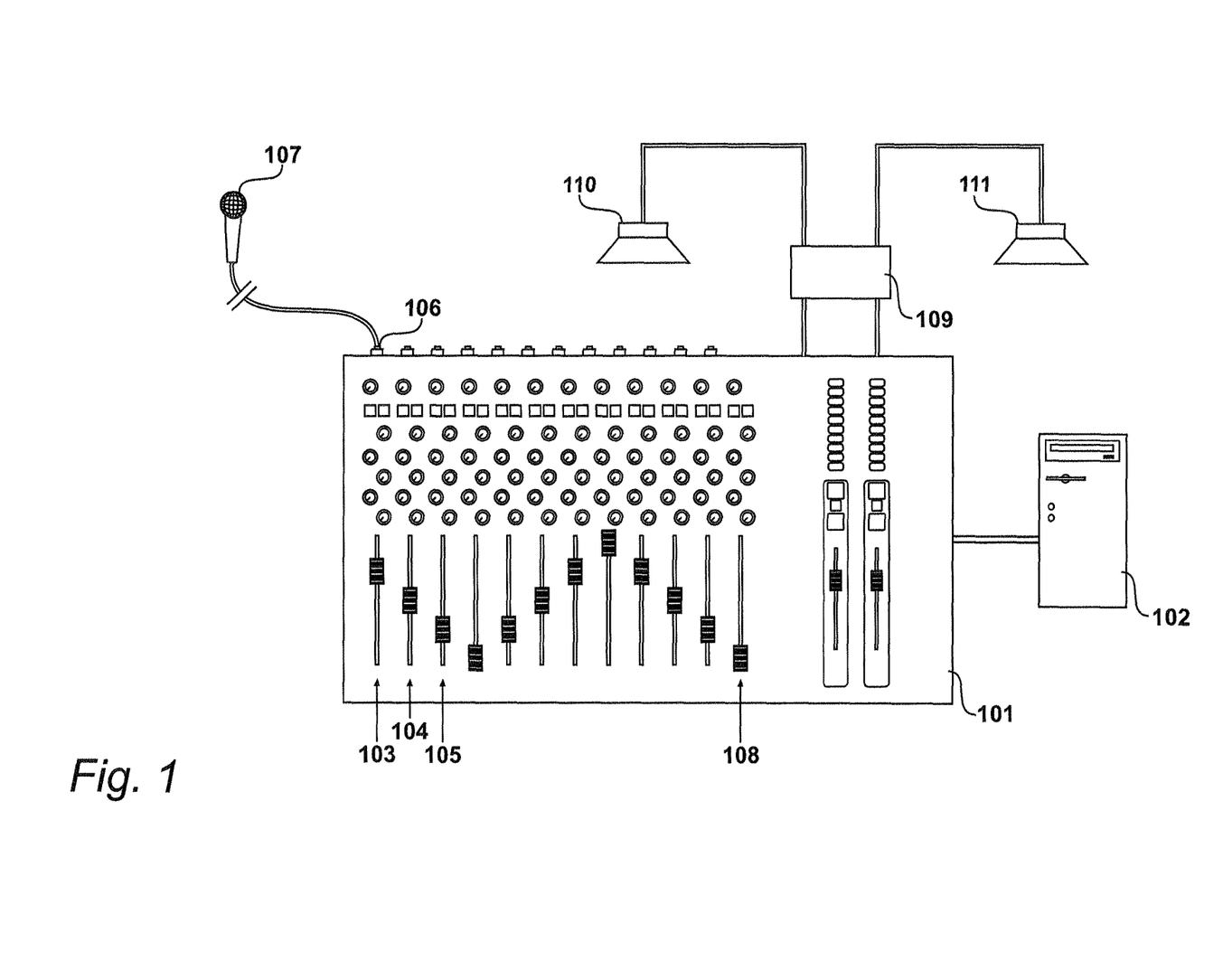
FIG. 1 shows an exemplary audio mixing configuration including a mixing console 101.

FIG. 1

An exemplary studio mixing configuration is illustrated in FIG. 1, in which a mixing console 101 according to the present invention is being used to mix numerous channels of digitised audio into one output for recording to a hard disk recording system 102. Mixing console 101 in the present example processes audio digitally, using an x86 CPU.

The mixing console 101 comprises a number of channel strips such as channel strips 103, 104 and 105. Each of these channel strips, for instance channel strip 103, is in this example configured to correspond to one particular input, such as input 106 which receives an input signal from a microphone 107. In this embodiment, the analog input signals to the mixing console 101 undergo analog-to-digital conversion at a sample rate of 96 kilohertz and at a depth of 24 bits whereupon they may then be processed in the digital domain. In the present example, the audio samples are stored as 32 bit floating point values. Each channel strip includes various controls such as rotary controls and buttons to effect different kinds of processing of the known type, such as compression, filtering, gain control etc.

In addition to the channel strips 103, 104 and 105, one channel strip in this example is configured as a bus strip 108. The bus strip is arranged to receive at its input a summed version of various signals present in the signal chain of each of channel strips 103, 104 and 105. An exemplary configuration of input signals for the bus strip 108 will be described further with reference to FIG. 2.

The mixing environment shown in FIG. 1 is completed by a power amplifier 109 which is provided to allow the mix to be monitored by an operator by means of two loudspeakers, 110 and 111. A recording of the final output mix is made by hard disk recording system 102. Should the mixing console 101 be operated in a live or broadcast environment, however, there may be multiple outputs of differing numbers of channels for onward transmission and monitoring by an operator.

Figure 2:
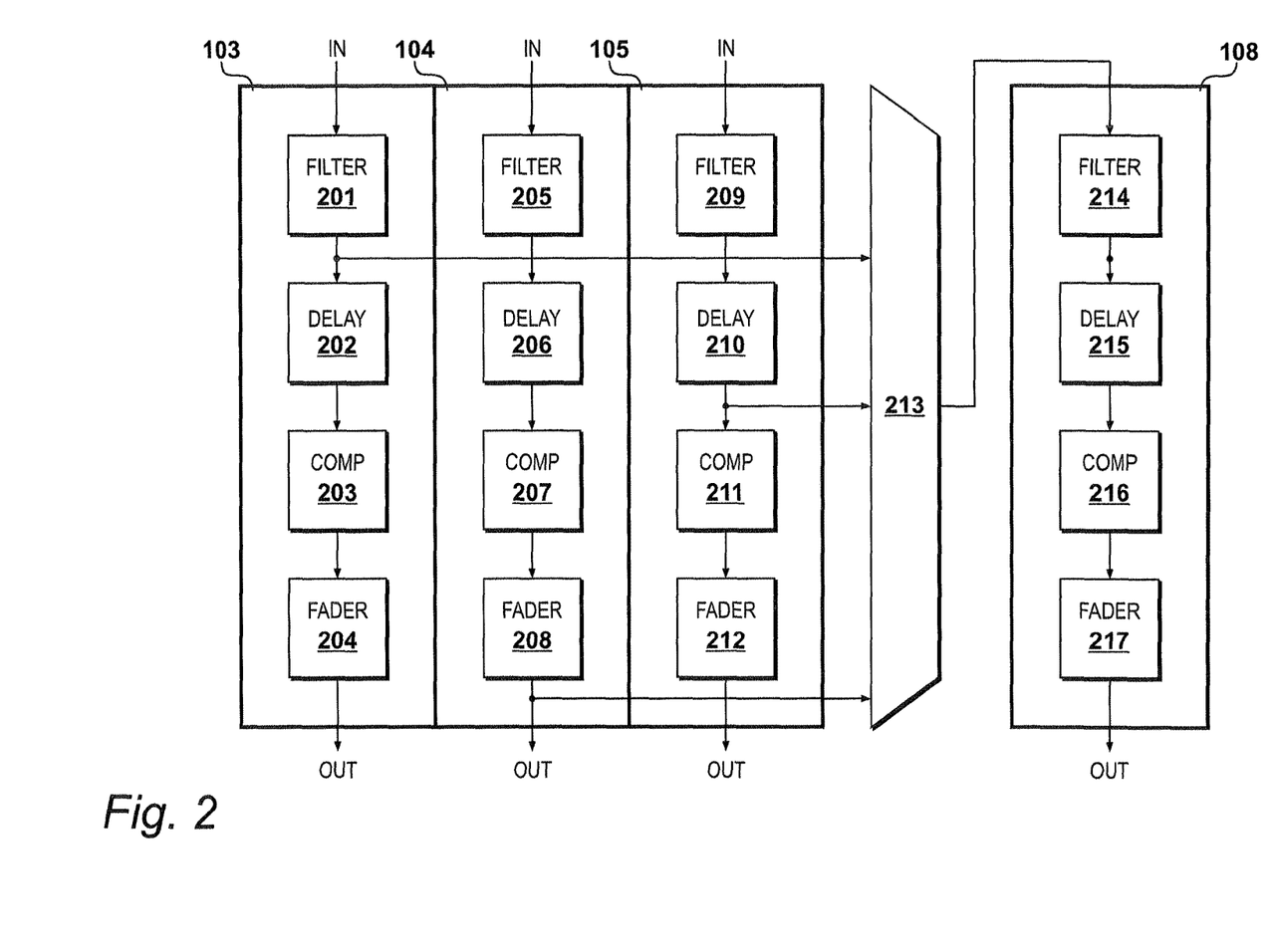
FIG. 2 shows an example of the routing of signals to a bus via a combiner 213.

FIG. 2

As described previously, the mixing console 101 may be configured to allow various signals in the signal processing chains for its channel strips to be routed and summed for input to bus strip 108. An example of such a configuration is shown in FIG. 2.

Each one of channel strips 103, 104 and 105 in the present embodiment is configured with a filter, a delay unit, a compressor and a fader. Thus, channel strip 103 includes a filter 201, a delay unit 202, a compressor 203 and a fader 204. Channel strip 104 includes a filter 205, a delay unit 206, a compressor 207 and a fader 208. Channel strip 105 includes a filter 209, a delay unit 210, a compressor 211 and a fader 212.

In the example configuration, the post-filter 201 signal from channel strip 103 has been routed to a combiner 213, along with the post-fader 208 signal from channel strip 104, and the post-delay unit 210 signal from channel strip 105.

In the present embodiment, the combiner 213 multiplies each one of these signals by a specified gain and adds them together. The resulting output is supplied to bus strip 108 for processing by its own filter 214, delay unit 215, compressor 216 and fader 217. The output signal from channel strip 108 is therefore a processed version of the weighted (according to the user-specified gain settings) sum of the various input signals to the combiner 213.

It will be appreciated that the example of FIG. 2 is much simplified, with many buses being utilised in parallel in mixing consoles in typical use cases. In some cases, the number of unique summations can approach of the order of 10,000.

Figure 3:
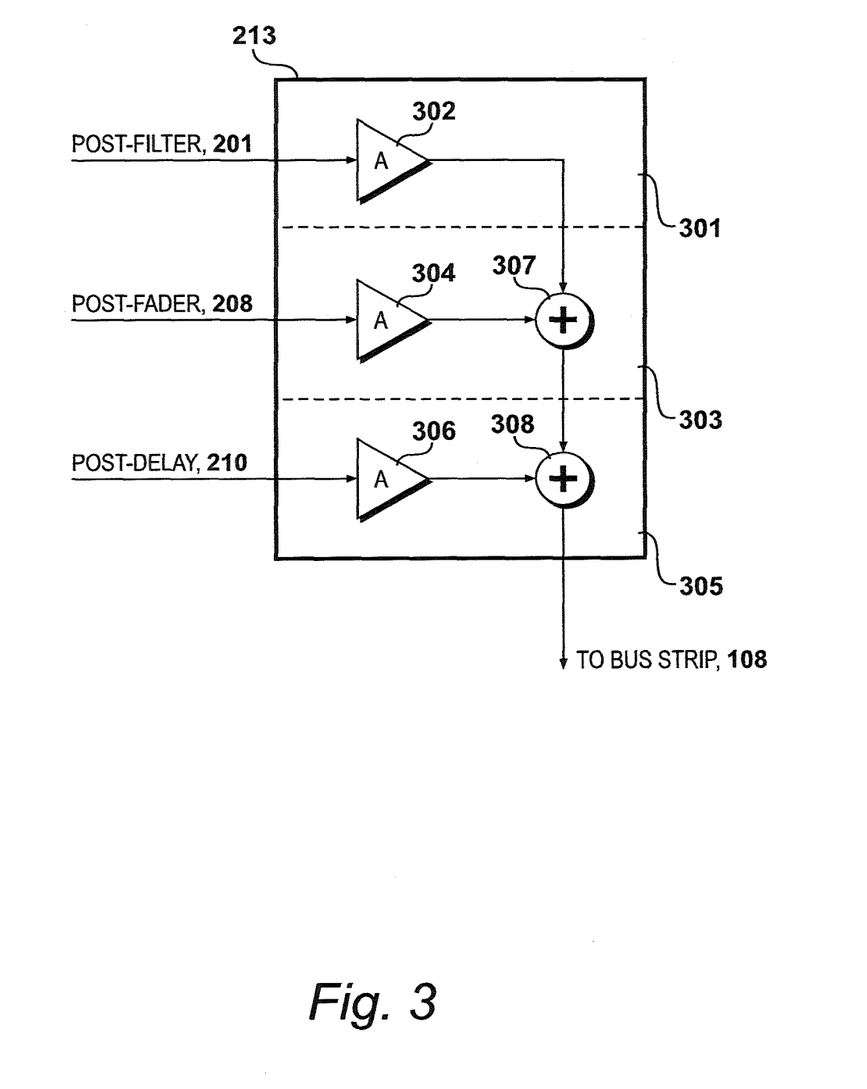
FIG. 3 shows the combiner 213 in more detail.

FIG. 3

Combiner 213 is shown in greater detail in FIG. 3.

The combiner 213 is conceptually made up of a number of cross points, which are the points where an input signal is received and optionally subjected to a degree of gain. Depending upon the configuration of the particular bus, no gain could be applied, the same gain or different amounts of gain for each input signal. Thus, in general, each input signal in the present embodiment is subjected to a degree of gain A, which is configurable on a per-cross point basis.

Referring to FIG. 3, the post-filter 201 signal is received at a first cross point 301, where gain is applied by a multiplier 302. The post-fader 208 signal is received at a second cross point 303, where gain is applied by a multiplier 304. The post-delay 210 signal is received at a third cross point 305, where gain is applied by a multiplier 306.

The output of multiplier 302 is provided to the input of an adder 307 along with the output of multiplier 304. Then, the output of multiplier 306 is provided to the input of an adder 308 along with the output of adder 307. The output of adder 307 is the output signal for combiner 213, which is provided to and may then be subjected to further processing in bus strip 108, for example.

Thus, the operations undertaken by combiner 213 are relatively simple, in that, for each cross point, all that needs to be done is, for the relevant sample to be read, multiplied by a gain coefficient (if any), and added to the output of the combiner 213. However, it will become apparent that this is a highly memory-intensive operation, and so measures must be taken to overcome the inherent weaknesses of general-purpose multi-core CPUs in terms of memory performance.

Figure 4:
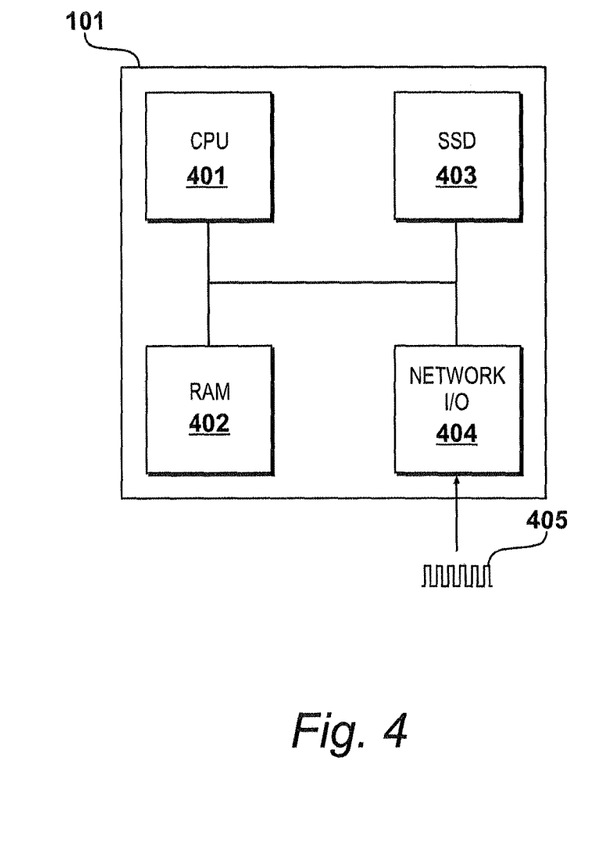
FIG. 4 shows components for processing within mixing console 101.

FIG. 4

As described in the introduction and with respect to FIG. 1, the mixing console 101 according to the present invention utilises an x86 CPU to process audio that has been subjected to analogue-to-digital conversion of the known type. A block diagram of components within the mixing console 101 for audio processing following such analogue-to-digital conversion is shown in FIG. 4.

A multi-core CPU 401 is provided, which in the present embodiment is an Intel® Xeon® E5-1650 processor which has six cores on the same die. The internal configuration of the CPU 401, in particular its layout of cache memory, will be described further with reference to FIG. 4.

Main memory in the form of random-access memory 402 is also provided for storing operating system instructions and audio processing instructions at runtime. The operating system in the present embodiment is RTOS-32 available from On Time Software of Groton, Mass., USA, which is a real time operating system that is compatible with the Microsoft® Win32 application programming interface.

In the present embodiment 4 gigabytes of DDR4 SDRAM are provided. Non-volatile storage is provided by a solid state drive 403, which in the present embodiment is 4 gigabytes in capacity, and stores permanent copies of instructions and data.

To enable the mixing console to be operated, a network interface 404 is provided whereby control commands may be received. In the present embodiment, a separate personal computer running Microsoft® Windows® Embedded is utilised to provide control for an operator, and issues commands via the network interface 404 so as to alter audio processing parameters, etc. In this way human interface devices such as the control surface of the mixing console 101, including its various buttons, rotary controls and faders, along with touchscreen interfaces etc. can be used.

The network interface 404 also allows program instructions 405 to be downloaded from a a network location such as a network attached storage device or an Internet-based resource, stored on solid state drive 403, loaded into RAM 402 and executed by CPU 401.

Figure 5:
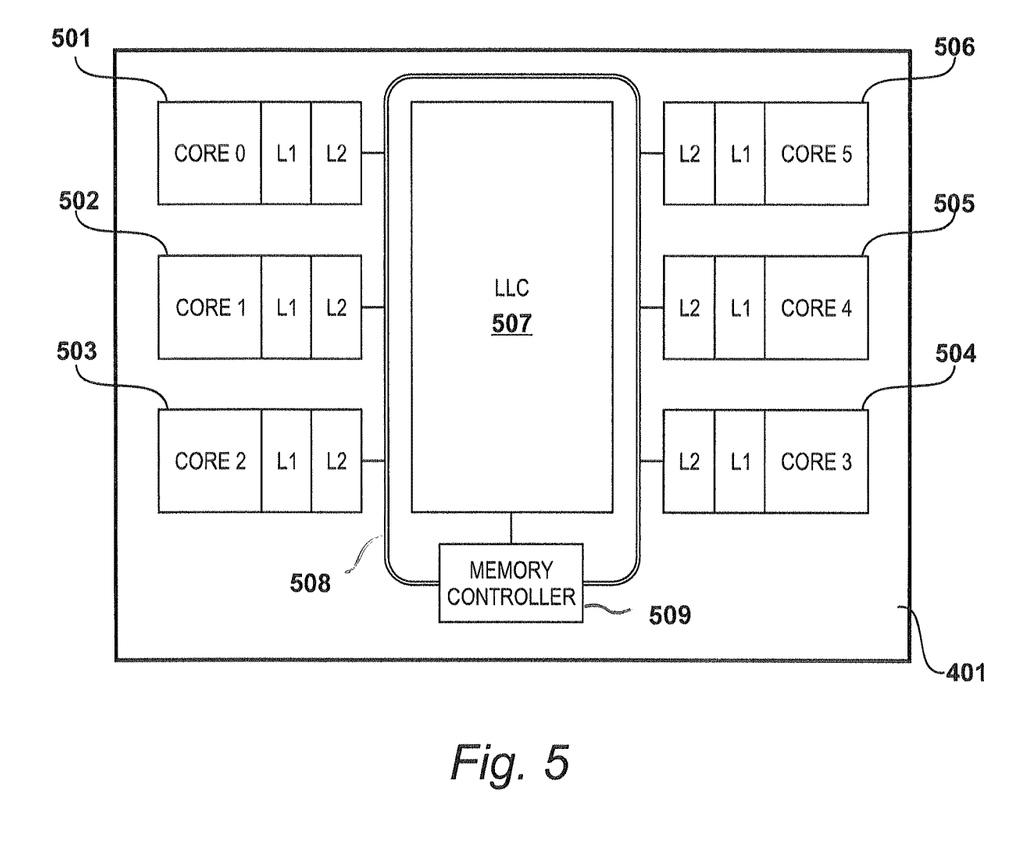
FIG. 5 shows CPU 401 in greater detail.

FIG. 5

As will be familiar to those skilled in the art, CPUs include various hierarchies of cache, the lower-numbered ones of which are faster, smaller and more local to a processing core. The CPU 401 is shown in FIG. 5 in greater detail, and, as described previously has six cores: core 501, core 502, core 503, core 504, core 505 and core 506. Each core has its own level 1 cache that is 32 kilobytes in size, and level 2 cache of 256 kilobytes in size. There is also provided a level 3, or last level cache 507, which is shared between each of the six cores and accessed via a ring bus 508 under the control of a memory controller 509. In the present example, LLC 507 totals 12 megabytes in size. Given each sample of audio is represented by a 32 bit floating point value in the present embodiment, there is sufficient capacity in LLC 507 to keep every single sample on-chip, without having to store it in RAM 402.

However, in order for processes to be executed in parallel amongst the cores, a degree of memory sharing must necessarily be carried out. Extracting high performance from the CPU 401, though, requires level 1 and level 2 cache accesses to be maximised and LLC accesses to be minimised. This involves minimising memory sharing and maximising temporal and spatial locality of data as amongst the cores.

As will be understood by those skilled in the art, modern CPU architectures include provisions for high-bandwidth data transport to and from the ring bus 508 by way of point-to-point interconnects. Intel® employ their proprietary QuickPath Interconnect system, whilst AMD® utilise the open HyperTransport interconnection technology as part of their Direct Connect Architecture for multiprocessor systems. Both systems therefore provide for low latency, high bandwidth connection between sockets in a multiprocessor system. Much development has gone into ensuring cache coherency between the sockets, to the point where it is possible to consider the LLC of each CPU in such an arrangement as being one and the same.

The present invention may therefore be extended to multiprocessor systems so as to provide further parallelism by making use of the optimisations in terms of cache coherency of the LLC.

Figure 6:
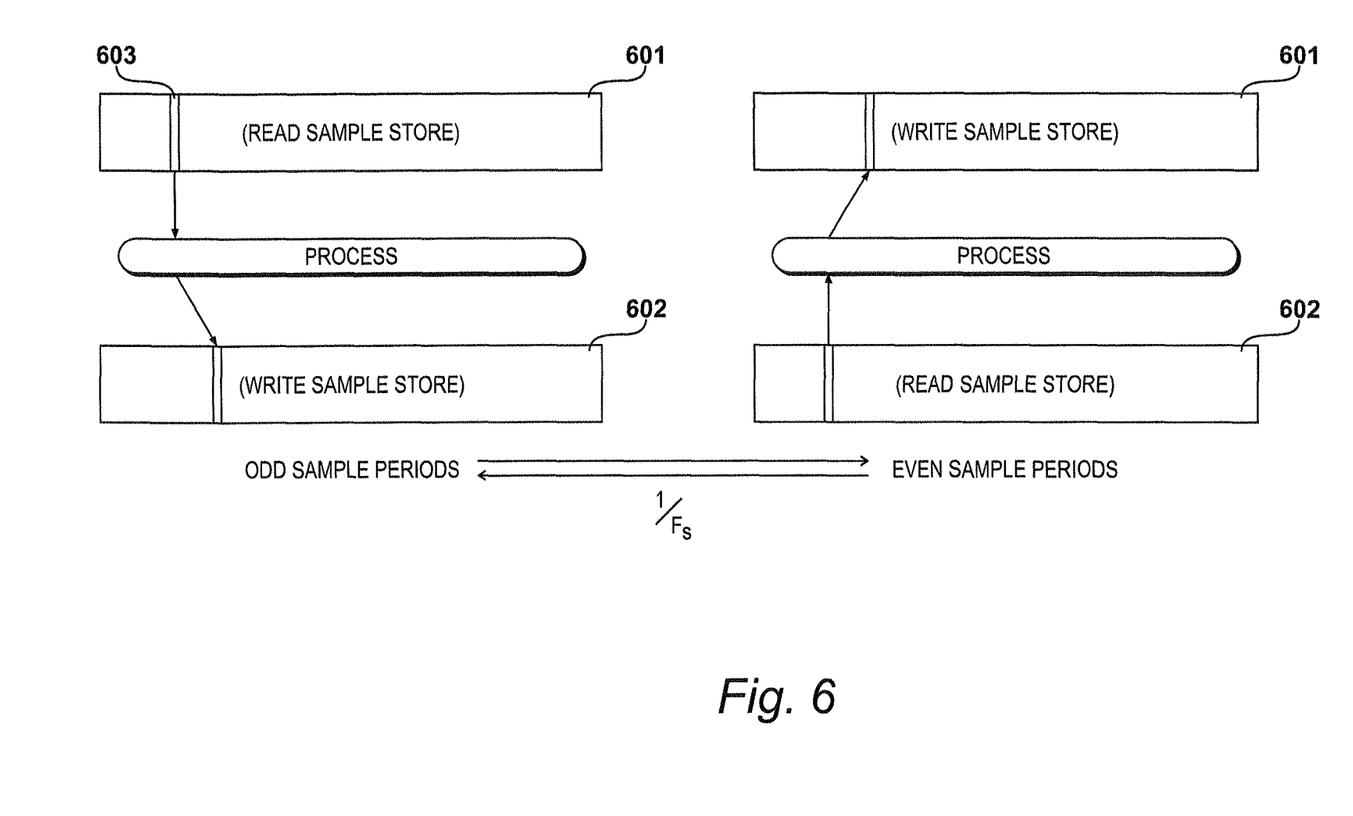
FIG. 6 shows the strategy for storing audio samples in cache in the CPU 401.

FIG. 6

Given the sufficiently large amount of storage provided by LLC 507, the mixing console 101 of the present invention can store two copies of all audio samples flowing through the console in the LLC 507. These copies have been named sample stores, and are shown in FIG. 6.

During odd audio sample periods, a first sample store 601 is designated the "read" sample store, and the second sample store 602 is designated the "write" sample store. Thus, any processing of samples during odd sample periods involves reading the sample, for example a sample 603, from the first sample store 601, and writing the processed version of it to the second sample store 602. Sample periods at a sample rate of 96 kilohertz are approximately 10.42 microseconds apart. Thus, after this period has elapsed, the designation of the sample stores is reversed. The first sample store 601 therefore becomes the designated write sample store and the second sample store 602 becomes the designated read sample store.

Figure 7:
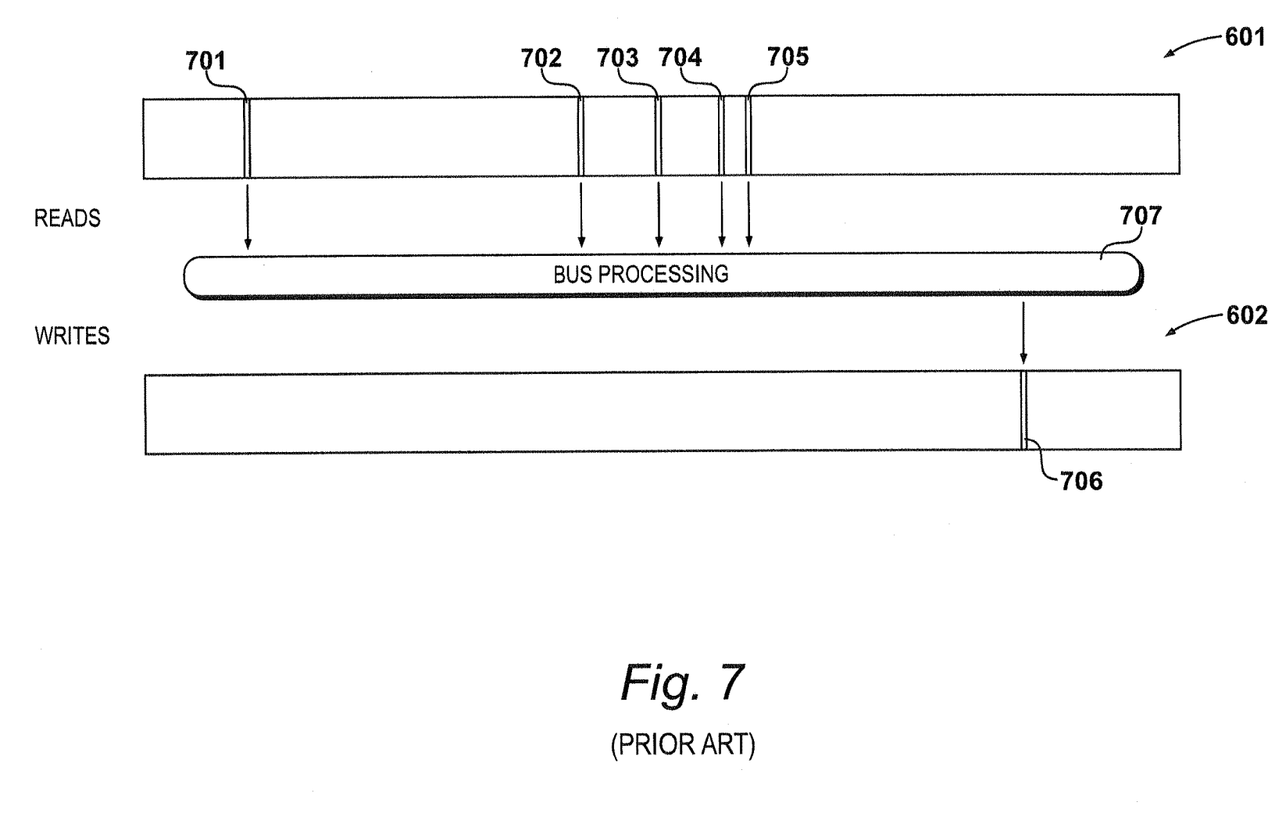
FIG. 7 shows a prior art method of reading, processing and writing samples.

FIG. 7

A prior approach to processing each bus configured in the mixing console 101 and those buses' cross points is shown in FIG. 7.

The processing of all buses was attempted in one sample period. Therefore, each required sample, in this example samples 701, 702, 703, 704, and 705 must be retrieved from the current read sample store (say, first sample store 601) before being processed and written as an output sample 706 to the write sample store (in this case is second sample store 602). This is because the bus processing step 707 involved performing the following steps, set out here in pseudocode:

```
for each bus:
    set output = 0
    for each cross point on current bus:
        input = read input sample value
        input = input * gain for cross point
        output = current output + input
        write output to sample store.
```

The issue with this approach is due to the flexibility in terms of the inputs which can be summed in a bus. The samples for the inputs tend to be greatly fragmented throughout the read sample store, and therefore do not tend to occupy consecutive cache lines in the LLC 507 in the CPU 401. The near-random memory accesses caused by fragmentation of the samples in the read sample store results in high cache churn and low utilisation of the level 1 and level 2 caches local to each core of the CPU 401. Further, it means that optimisations in the memory controller 509 such as prefetchers and access pattern predictors do not get used. In addition, because the sample stores are kept in LLC 507, and cache lines are constantly being checked in and out, unavoidable snooping via the ring bus 508 to other cores is caused as part of the memory controller's attempts to ensure data consistency. The end result is that a large amount of time is wasted bringing data up the cache hierarchy in the CPU 401.

Figure 8:
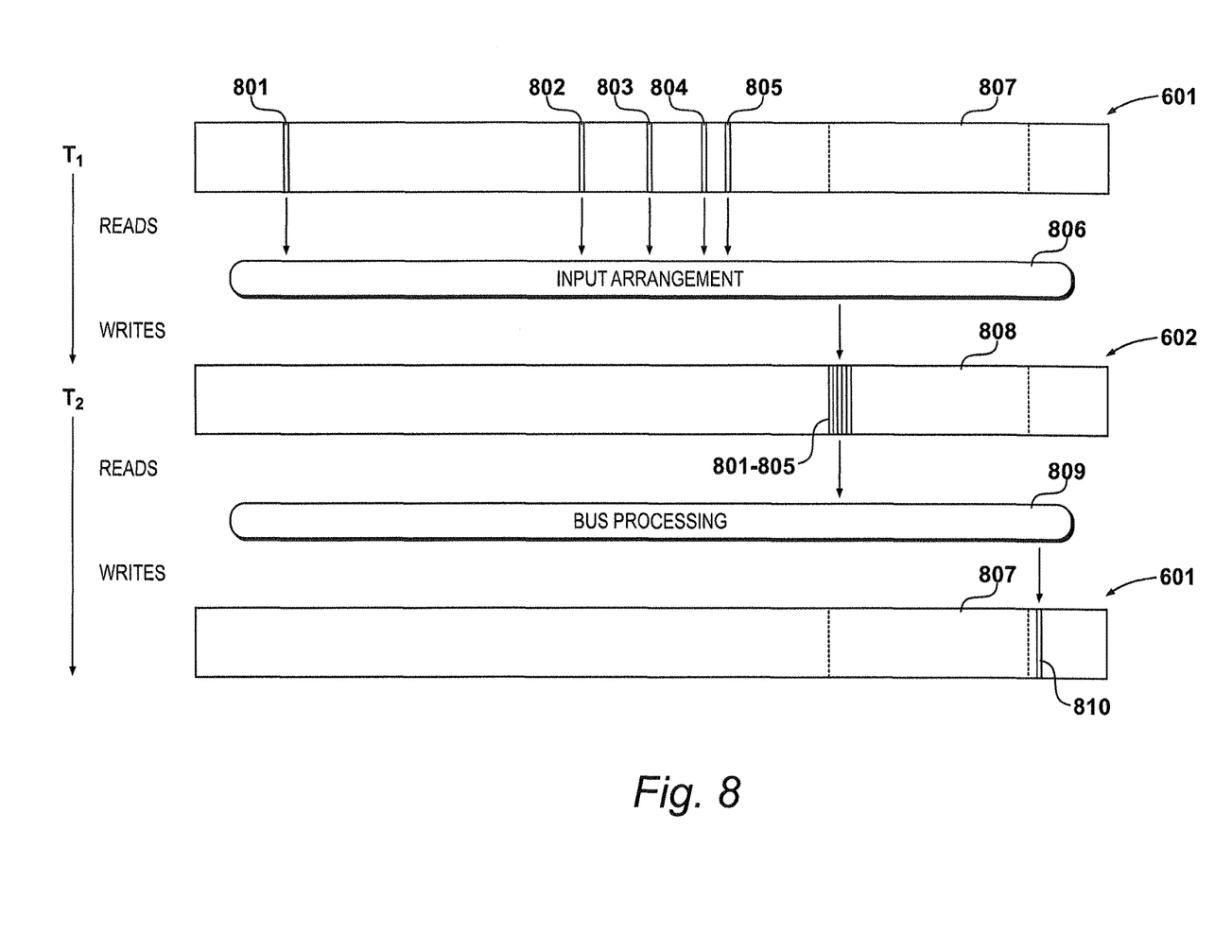
FIG. 8 shows the method of the present invention in a similar form to FIG. 7.

FIG. 8

The present invention takes a technical approach to alleviating the above-mentioned problems, by introducing measures to, in effect, defragment the unique samples in the sample store that are to be used for bus processing. Such a scheme is shown in FIG. 8.

During a first sample period $T_1$, the unique samples such as samples 801, 802, 803, 804 and 805 are read from the read sample store (in this case first sample store 601) by an input arrangement process 806 running on its own dedicated core of CPU 401. The input arrangement process 806 copies the samples to a specially designated contiguous portion of what is currently the write sample store (in this case second sample store 602). In the Figure, the contiguous portion is identified in the first sample store 601 as contiguous portion 807, and identified in the second sample store 602 as contiguous portion 808.

The order in which the samples are written to the contiguous portion of the sample store is determined by a list of cross points stored in memory, the generation of which will be described with reference to FIG. 10. The input arrangement process 806 is carried out on its own core on CPU 401 so as to prevent any impact on other ongoing processes due to its high utilisation of cache.

In the present example, the sample stores have space for 9000 samples in total, and the contiguous portions provide space for 1500 samples. The space provided is, however, purely a matter of implementation and the capacity of the LLC on the particular CPU used.

During a second sample period $T_2$, in which the second sample store 602 is now designated as the read sample store, the copies of the unique sample, such as samples 801, 802, 803, 804 and 805 are read from the contiguous portion 808 during the bus processing step 809, which, in the example applies the appropriate gain multipliers and then sums the samples 801, 802, 803, 804 and 805. The output samples such as output sample 810 are then written to the currently-designated write sample store. The bus processing step 809 is carried out concurrently by a plurality of processor cores in parallel to improve throughput.

Thus, the present invention does increase the latency in the mixing console due to the input arrangement process 806. In addition, the input arrangement process 806 is not particularly sympathetic to how the CPU's cache operates, in that it is reading fragmented samples from and writing them to a contiguous portion of the LLC 507.

However, an overall improvement in efficiency is achieved because the number of sparsely-arranged samples that are read by the input arrangement process 806 is far less than the total number of cross points that are processed during the bus processing step 809. During the bus processing step 809, samples are accessed in order from a contiguous portion of the read sample store. This results in a large reduction in cache churn and the available memory controller optimisations (e.g. prefetchers, access pattern predictors, etc.) become beneficial.

In the present embodiment, the input arrangement process 806 comprises a plurality of input arranger jobs, each of which has responsibility for making a copy of a single one of the samples in the read sample store to the write sample store. In the present implementation, there is a fixed number of input arranger jobs, and the number is set at the maximum number of possible samples that could ever be feeding mixing buses. This value is determined by the feature set of the mixing console 101, i.e. its number of stem feeds, its number of matrix inputs, its number of auxes, etc., and as an example may be around 1500.

In one implementation, all of the available input arranger jobs are utilised for copying input samples, irrespective of the number of input samples and active buses. Thus, multiple copies of individual input samples are copied to the contiguous portion of the write sample store by the input arrangement process 806 to increase the availability of the samples and reduce data sharing between the cores of CPU 401.

Figure 9:
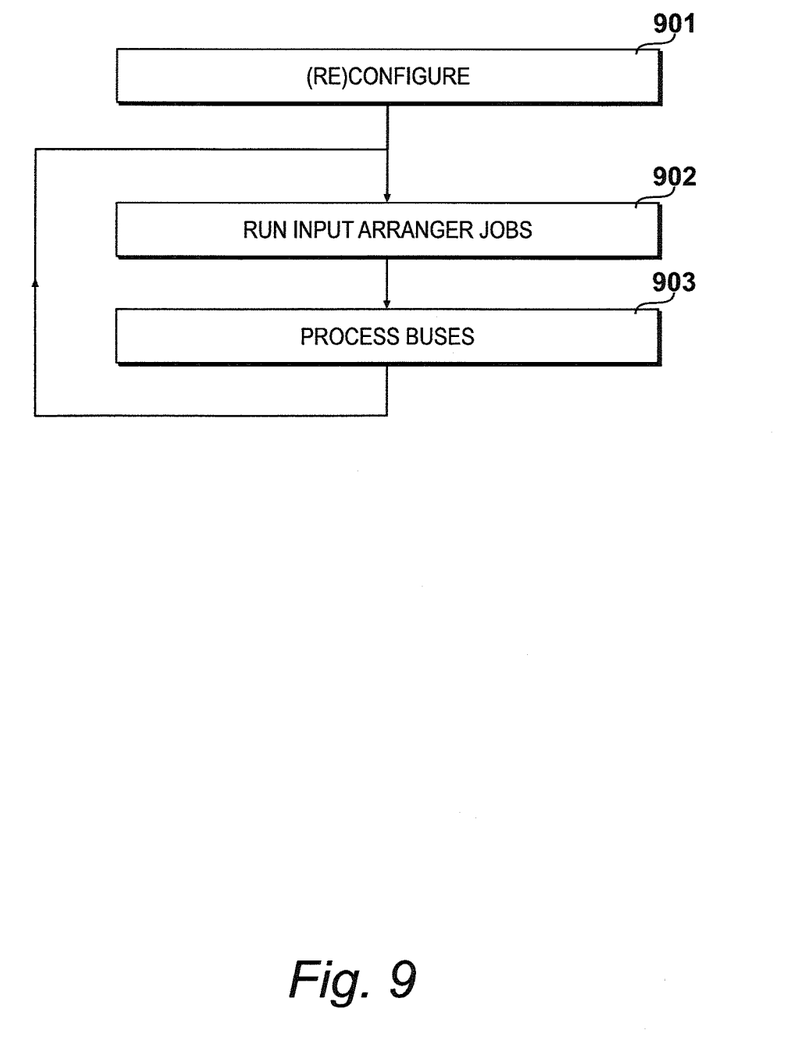
FIG. 9 shows steps carried out by the CPU 401 during runtime.

FIG. 9

An overview of procedures carried out by CPU 401 in the mixing console 101 in the context of mixing audio for buses and in accordance with the instructions of the present invention is shown in FIG. 9.

Upon initialisation, or following a settings change by an operator of the mixing console, a step of configuration 901 (or reconfiguration as the case may be, should a parameter be altered by an operator) is performed, during which a list of all cross points for all inputs over all defined buses is generated. A reconfiguration of the mixing console 101 with respect to any bus settings, such as routes or gain settings, will invoke step 901. Step 901 will be described in greater detail with reference to FIG. 10.

Following step 901, audio is processed by first running all input arranger jobs at an input arrangement process step 902, so as to duplicate samples in the sample store to the contiguous portion thereof, followed by a bus processing step 903. Step 902 will be described in further detail with reference to FIG. 11, and step 903 will be described in further detail with reference to FIG. 12.

Figure 10:
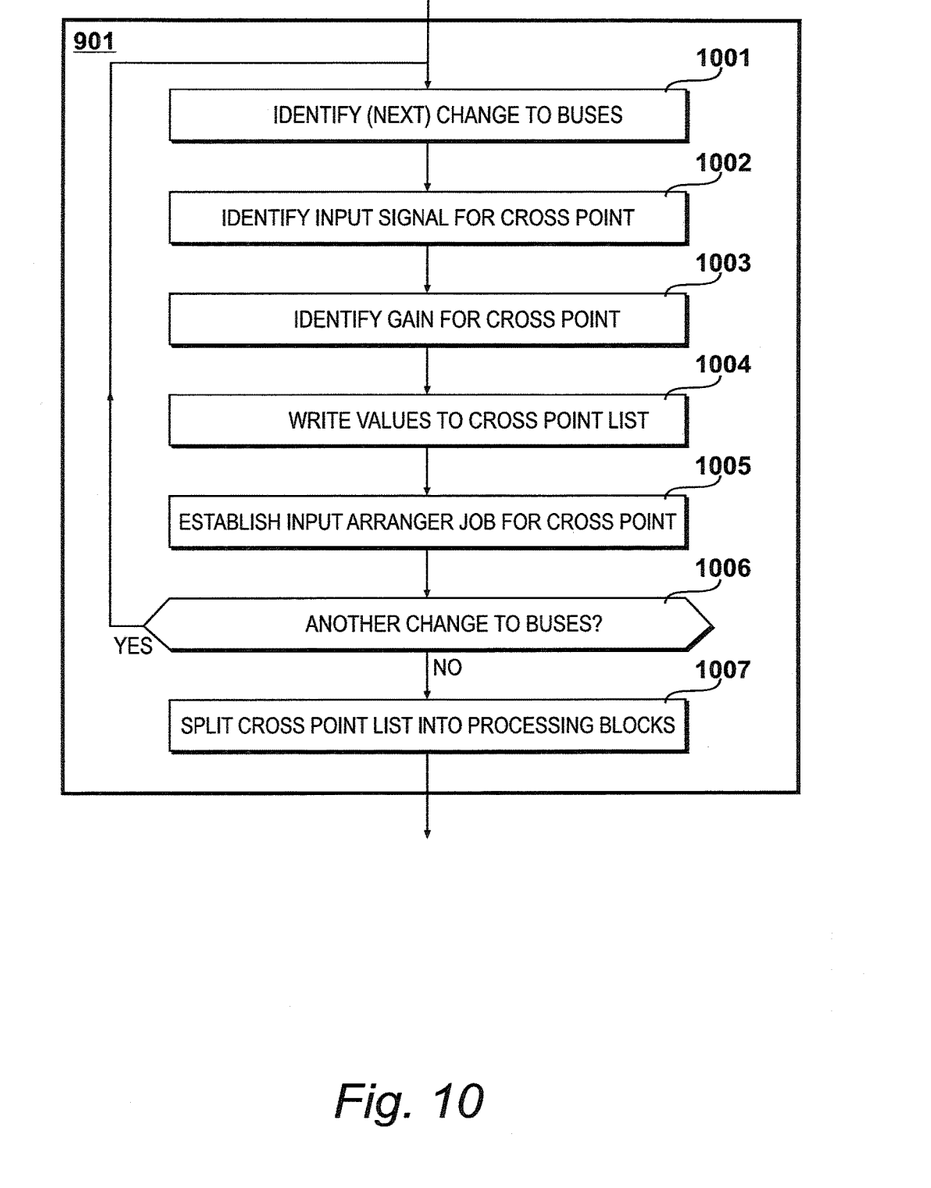
FIG. 10 shows steps carried out to configure input arrangement and cross point processing jobs.

FIG. 10

Steps carried out during step 901 to configure buses ready for processing are shown in FIG. 10.

At step 1001, a change to a bus is identified, such as a change to a gain coefficient, or the addition of a cross point for a bus.

At step 1002, the input signal is identified, and at step 1003 the gain for cross point is identified. These values are written at step 1004 to a cross point list in memory in the mixing console 101, either adding or overwriting an entry. At step 1005, an input arranger job is configured within the input arrangement process of step 902 so as to ensure that the sample for the input signal is duplicated to the contiguous portion of the sample store during step 902. Thus in the present example, an input arranger thread is configured to copy the appropriate sample for the input signal.

At step 1006, a question is asked as to whether any more changes have been made, and if so control returns to step 1001 where the next change is identified. If all changes have been considered, then control proceeds to step 1007

After all changes have been identified, the list of input arrangement jobs is sorted according to the location in memory of the samples that are to be arranged. This is to increase the temporal and spatial locality of the data when being read by the input arrangement process.

After this process is complete, the cross point list is split into blocks at step 1007. The processing blocks in in the present embodiment are cache-aligned data structures which contain all of the cross point data (including the identities of the inputs and the gain to be applied) for a whole number of buses. The cross points for a given bus are all contained in the same block, such that a particular bus's output is computed on only one single core. This avoids problems with data sharing caused by accumulating different outputs from different cores.

These blocks of data are then dispatched during runtime to different cores which perform the operations carried out during step 903 in parallel.

Figure 11:
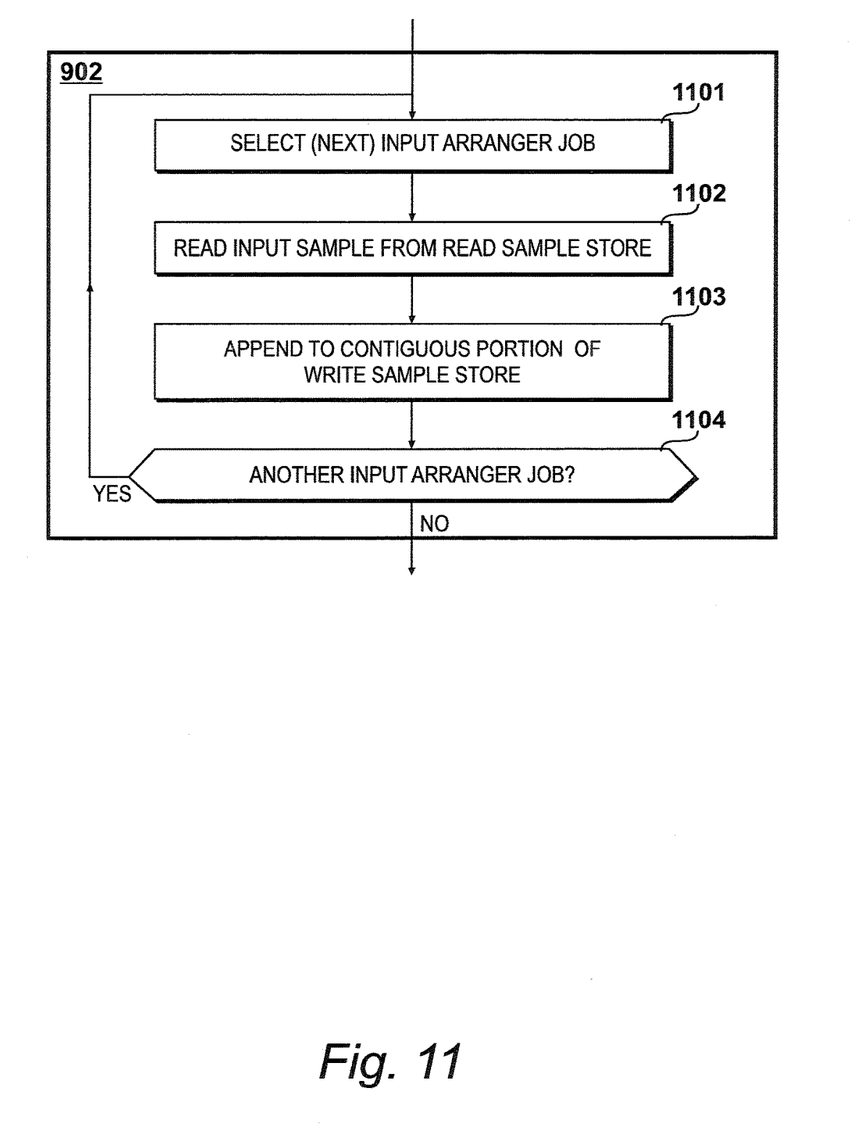
FIG. 11 shows steps carried out to process input arrangement jobs.

FIG. 11

Steps carried out during step 902 to run all input arrangement jobs are shown in FIG. 11.

At step 1101, an input arranger job is selected, and at step 1102 the corresponding input sample for the input signal of the cross point is read from the current read sample store. At step 1103, the sample is appended to the contiguous portion of the current write sample store. At step 1104, a question is asked as to whether another input arranger job for another cross point needs to be run. If so, control returns to step 1101 where the next job is scheduled in and run. If not, then step 902 is complete.

Figure 12:
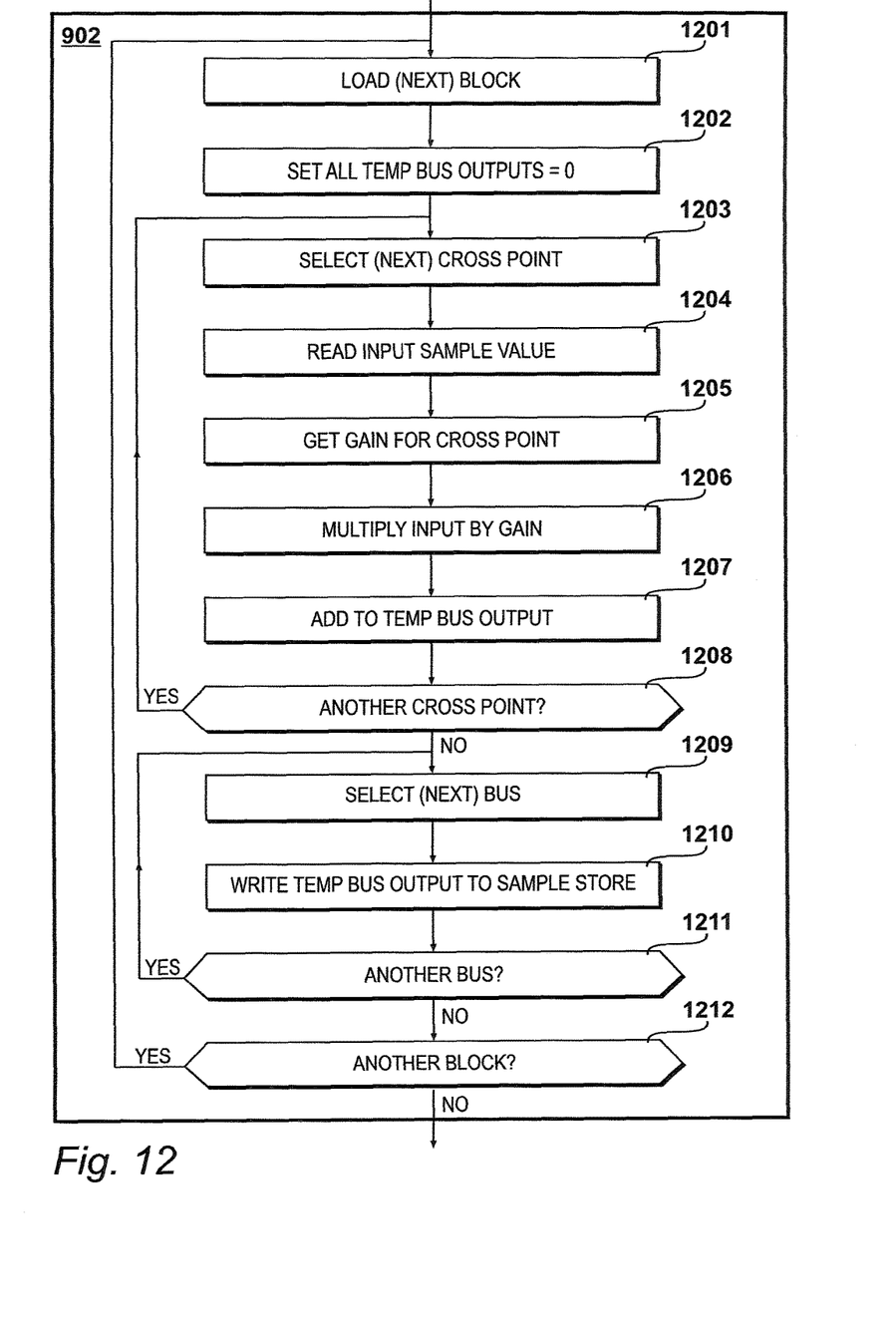
FIG. 12 shows steps carried out to process audio given a bus and cross point configuration.

FIG. 12

Steps carried out during step 903 to process a processing block's worth of buses are shown in FIG. 12.

It will be appreciated that multiple executions of step 903 will be performed in parallel—one by each CPU core designated for such a purpose—so as to work through all of the processing blocks generated at step 1007. In the present embodiment, four cores of the CPU 401 are used for executions of step 903, with another core allowing simultaneous execution of the input arrangement process of step 902, and the final core being a general purpose core running the operating system processes, etc. Thus, broadly considered, in the present embodiment the carrying out of step 903 is split between and performed in parallel by a plurality of cores of the CPU 401, such that each one of that plurality of cores performs step 903 for a subset of the mixing buses.

At step 1201, a block produced during step 1007 is loaded. Each processing block consists of a list of cross points that is sorted according to the location of the cross point's input sample in the contiguous portion of the read sample store. Thus it is a requirement to accumulate total values for each bus in temporary outputs. At step 1202, temporary bus outputs for each bus in the processing block are set to zero.

At step 1203, the next cross point is selected from the processing block, and at step 1204, and the appropriate input sample value is read from the contiguous portion of the current read sample store in LLC 507. This necessarily brings a whole cache line into the cache local to the core upon which step 903 is being executed, and, due to optimisations in the CPU 401, may bring subsequent cache lines up the cache hierarchy which can be used in later iterations of step 1204.

At step 1205, the gain for the cross point is read out of the processing block and at step 1206 the sample value is multiplied by the gain value. The output of step 1206 is added to the temporary output for the bus that the cross point belongs to at step 1207.

Following this process of accumulation, a question is asked at step 1208 as to whether there is another cross point in the processing block. If so, control returns to step 1203. If not, then control proceeds to step 1209 where a bus is selected and the temporary bus output, hitherto only stored on cache local to the core running the current instance of step 903, is committed to LLC 507 at step 1210. A question is asked at step 1211 as to whether there is another bus whose temporary output needs writing to LLC 507, and if so control returns to step 1209. This loop continues until all temporary bus outputs have been written, after which a question is asked as to whether any more processing blocks need to be processed. If so, control returns to step 1201 where the next block is loaded and processed. If not, then step 903 is complete for the current sample period.

Thus access to LLC 507 is minimised because the multiply-accumulate operations take place upon the level 1 and level 2 caches local to a particular core until they are finished. This reduction in operations requiring reads and writes to LLC enables the present invention to extend to multiprocessor (i.e. multiple sockets) systems that utilise point-to-point interfaces to synchronise their LLC.

It will be appreciated that step 903 processes in order of cross point, which is the same as the order of samples in the contiguous portion of the sample store. In this way, cache access is greatly improved, and avoids bottlenecks caused by memory access in the CPU 401. Indeed, as described previously, in one embodiment of the present invention multiple input arranger jobs are run to further increase the availability of input samples in the contiguous portion of the read sample store. Use of such a technique means that it is less likely that cache lines will be brought into cache local to a core that do not contain an input sample which is going to be utilised in the cross point processing carried out on that core. This further reduces the instances of dirty cache lines being requested by other cores.

I claim:

1. A method of mixing digital audio signals to produce digital audio output signals on respective mixing buses, the method comprising the steps of:
   (i) storing an input sample value of each digital audio input signal in a shared last level cache in a multi-core central processing unit;
   (ii) contiguously writing a sample value for each digital input audio signal to said shared last level cache such that contiguously written sample values are contiguous to each other; and
   for each mixing bus:
   (iii) reading contiguous sample values for each digital audio input signal included in a mix for the respective bus;
   (iv) adding said contiguously read sample values to produce an output sample; and
   (v) writing said output sample to said shared last level cache.

2. The method of claim 1, in which step (ii) is performed for each one of said unique inputs by a respective unique process, each one of which is executed on a same core of the central processing unit.

3. The method of claim 1, in which the carrying out of step (iii) is split between and performed in parallel by a plurality of cores of the central processing unit, such that each one of that plurality of cores performs step (iii) for a subset of the mixing buses.

4. The method of claim 1, in which the output value for each bus in step (iii) is accumulated on a cache that is local to a particular core of the central processing unit upon which step (iii) is carried out before being committed to said shared last level cache at step (v).

5. The method of claim 1, in which the sample value is multiplied by a gain coefficient prior to the addition operation performed in step (iv).

6. A mixing console having a multi-core central processing unit for mixing digital audio signals on respective mixing buses, and in which the central processing unit is configured to perform the steps of:
   (i) storing an input sample value of each digital audio input signal in a shared last level cache in the multi-core central processing unit;
   (ii) contiguously writing a sample value for each digital input audio signal to said shared last level cache such that contiguously written sample values are contiguous to each other; and
   for each mixing bus:
   (iii) reading contiguous sample values for each digital audio input signal included in a mix for the respective bus;
   (iv) adding said contiguously read sample values to produce an output sample; and
   (v) writing said output sample to said shared last level cache.

7. The mixing console of claim 6, in which the central processing unit is configured so that step (ii) is performed for each one of said unique inputs by a respective unique process, each one of which is executed on a same core of the central processing unit.

8. The mixing console of claim 6, in which the central processing unit is configured so that the sample value for each input for each bus is only read into a local cache of one core from the shared last level cache.

9. The mixing console of claim 6, in which the central processing unit is configured to accumulate the output values for the buses in step (iii) on local caches of single cores of the central processing unit before committing said output values to said shared last level cache at step (v).

10. The mixing console of claim 6, in which the central processing unit is configured to multiply the sample value by a gain coefficient prior to the addition operation performed in step (iv).

11. A non-transitory computer-readable medium having encoded thereon computer-readable instructions executable by a computer having a multi-core central processing unit, which instructions, when executed by the computer, cause the computer to perform a method of mixing digital audio signals on respective mixing buses, the method comprising the steps of:
    (i) storing an input sample value of each digital audio input signal in a shared last level cache in a multi-core central processing unit;
    (ii) contiguously writing a sample value for each digital input audio signal to said shared last level cache such that contiguously written sample values are contiguous to each other; and
    for each mixing bus:
    (iii) reading contiguous sample values for each digital audio input signal included in a mix for the respective bus;
    (iv) adding said contiguously read sample values to produce an output sample; and
    (v) writing said output sample to said shared last level cache.

12. The non-transitory computer-readable medium of claim 11, in which step (ii) is performed for each one of said unique inputs by a respective unique process, each one of which is executed on a same core of the central processing unit.

13. The non-transitory computer-readable medium of claim 11, in which the carrying out of step (iii) is split between and performed in parallel by a plurality of cores of the central processing unit, such that each one of that plurality of cores performs step (iii) for a subset of the mixing buses.

14. The non-transitory computer-readable medium of claim 11, in which the output value for each bus in step (iii) is accumulated on a cache that is local to a particular core of the central processing unit upon which step (iii) is carried out before being committed to said shared last level cache at step (v).

15. The non-transitory computer-readable medium of claim 11, in which the sample value is multiplied by a gain coefficient prior to the addition operation performed in step (iv).

\* \* \* \* \*